US006540138B2

(12) United States Patent
Hall et al.

(10) Patent No.: US 6,540,138 B2
(45) Date of Patent: Apr. 1, 2003

(54) VOTING METHOD AND SYSTEM

(75) Inventors: James Hall, Cherry Hill, NJ (US); Jerome Swartz, Old Field, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/020,767

(22) Filed: Dec. 12, 2001

(65) Prior Publication Data

US 2002/0074399 A1 Jun. 20, 2002

Related U.S. Application Data

(60) Provisional application No. 60/257,213, filed on Dec. 20, 2000.

(51) Int. Cl.[7] .................................................. G06K 7/00
(52) U.S. Cl. .......................................... 235/386; 235/51
(58) Field of Search .................... 235/386, 51; 346/409

(56) References Cited

U.S. PATENT DOCUMENTS 5,610,383 A * 3/1997 Chumbley .................. 235/386

* cited by examiner

*Primary Examiner*—Harold I. Pitts

(57) ABSTRACT

A voting system wherein a voter identification card is provided to a voter having an optical code including voter identification information. The optical code on the voter identification card of a voter is read at a polling station prior to permitting said voter to vote and a digital signature is received from the voter. A handheld wireless data acquisition device is provided to the voter for making voting selections and a receipt with the voting selections made by said voter is printed. The voting selections are wirelessly transmitted from the handheld wireless data acquisition device to a host computer for tallying the voting selections from a plurality of voters.

14 Claims, 3 Drawing Sheets

VOTING METHOD AND SYSTEM

REFERENCE TO PREVIOUS APPLICATIONS

This application claims the benefit of U.S. Provisional Patent Application Serial No. 60/257,213, filed Dec. 20, 2000, which is incorporated herein by reference in its entirety.

BACKGROUND OF THE INVENTION

The present invention relates to a method and system for voting, and in particular, to a method and system for voting using bar code and wireless technologies.

A cornerstone of America's leadership in the world has been the integrity of our political process. The orderly and peaceful transfer of power from one administration to the next has been, and remains, integral to our success. Whether a President was elected in a landslide or a cliffhanger, the integrity of the process has always established the legitimacy of the incoming administration and conferred the authority to govern.

As the dysfunctional electoral mechanics play out, there are growing cries for reform. Senator-elect Clinton has called for the Electoral College to be abandoned, a lengthy undertaking with no certainty of adoption. Even if popular voting were eventually adopted, it would not solve the underlying problem of obtaining an accurate count.

The simple technology underpinnings of an effective 21st century system are bar coded voter registration cards, low-cost data-entry devices and secure communication links—the same technology used at the checkout counter in thousands of stores today. By employing these proven, familiar technologies that are already widely used in the private sector and government, the country can have a system that is much fairer, faster and more accurate—and outcomes that are easily and unambiguously verified.

In short, we can easily do the basics of Democracy 101—vote, count, recount and certify—far better than we can today.

What's more, using today's technology will enable us to preserve the elements of our current system that are sacrosanct. That is, it would make it easy for people to register to vote, even up until the day of the election, thus ensuring the widest possible access to the process. It would also ensure that voting would remain a private matter. There need be no links between verifying eligibility and the content of the subsequent vote.

At the same time, this technology platform would provide the flexibility our federal system requires to handle national choices as well as state and local candidates and referenda on a common, but decentralized, platform. With this platform, the U.S. electorate will have the capabilities we need and a process worthy of this great country.

Bar codes long ago outgrew the supermarkets where most people first encountered them—and they have gone on to revolutionize the way companies and government agencies capture, track, report and audit vast quantities of data. Because it is adaptable, proven and inexpensive, bar code scanning technology is an excellent vehicle for helping to manage the voting process.

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another so bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing, system for applications in point-of-sale processing inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application and all of which are incorporated herein by reference in their entirety. As disclosed in the above patents, such scanning systems includes, inter alia, fixed mount scanners, sometimes referred to as slot scanners, and hand held, portable laser scanning devices supported by a user, which are configured to allow the user to aim the scanning head of the device, and more particularly, a light beam, at a targeted symbol to be read.

Such prior art devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

SUMMARY OF THE INVENTION

The basis for a new, flexible system for polling citizens could be the advanced bar codes already being used on driver's licenses in many states. The most popular is PDF417, a two-dimensional bar code, described in U.S. Pat. No. 5,304,786 and which is described in the published AIM Standard therefore. In addition to carrying driver information, the bar code could easily carry voter registration data. Voters who do not have a driver's license could be issued PDF417 bar coded voter registration cards. A voter would present his or her card at the polling place, which would be swiped through a reader. Voters would then enter a digital signature (or otherwise encrypted identification) to establish their identity and verify their eligibility, which could have been established well in advance or on the spot using one of a number of identity verification solutions already in the marketplace.

With their eligibility verified, the voter would enter the voting booth and make his or her selections on a simple handheld device. Should the voter be unable to read a small handheld device display, a laptop computer could be made available with a bigger display to better read the voting choices. When complete, the system would display the choices and ask the voter to review them. Clicking the yes button would validate the selections and record the vote. A numbered receipt, encrypted in PDF417 and listing the choices made could be printed on the spot, giving the voter a definitive record—and a final opportunity before leaving the polling place to confirm that the choices made were the choices intended. PDF417 would allow for voter anonymity.

Portable data entry devices that are suitable for recording votes are preferably portable terminals such as the Symbol Technologies SPT-1500, and its PDT and PPT lines of terminals. Preferably, these same devices will have bar code readers built in or connected thereto which are capable of reading advanced bar codes such as PDF417, capable of receiving a digital signature and voting selection entry, so that identification and voting can be carried out on one device. These devices are also capable of transmitting data using wireless protocols such as Spectrum 24, Blue Tooth and IRDA so that the data recorded thereon can be sent to a central computer.

This approach would enable the preferences of eligible voters to be gathered, transmitted and aggregated much faster and more accurately than is now the case. With votes electronically captured, data could be transmitted to a central computer over secure, low-cost wireless communication links. Election officials could transmit data in real time, at set times during the day or immediately after the polls closed. One byproduct of this system would be accurate and timely information for the press.

Whatever the final outcome of this year's presidential election, we should, as citizens, ensure that the election of the first President of the new millennium is the last elected using early $20^{th}$ century technology. We have the way; we need the will.

The main object of the present invention is an improved method for voting, wherein a bar code bearing voter identification information is read to identify a voter, and the voter's choices are transmitted via a wireless data acquisition device to a central computer.

Another object of the present invention is to provide increased security in a voting method by utilizing a digital signature to further identify a voter.

A still further object of the present invention is to provide a receipt printed in PDF417 with the voting selection made by a voter for confirmation of the voter's choices. This would be a key element to secure almost 100% accuracy in the event of a recount.

These and other objects of the present invention are achieved in accordance with the present invention by a method for voting which comprises providing a voter identification card to a voter having an optical code, including voter identification information, reading the optical code on the voter identification card at a polling station prior to permitting the voter to vote, receiving an electronic signature from the voter, providing a handheld wireless data acquisition device to the voter for making voter's selections, printing a PDF417 receipt with the voter's selections and wirelessly transmitting the voter's selections from the handheld wireless data acquisition device to a host or central computer for tallying the voting selections from a plurality of voters.

In a preferred embodiment, the optical code is a two-dimensional bar code, and most preferably, PDF417. The voter identification card is preferably a motor vehicle license bearing a two-dimensional bar code.

In accordance with preferred embodiments of the present invention, the wireless transmission protocol can be the IRDA protocol, the Blue tooth protocol, an rf protocol, such as Spectrum 24, and other standard and non-standard communications protocols.

The handheld wireless data acquisition device can have a keyboard input or can have a touch screen data input for making voter selections.

In a preferred embodiment of the present invention, the handheld wireless data acquisition device can also be used to read the optical code and to receive the electronic signature.

These and other objects and features of the present invention become more apparent from the following detailed description of the invention taken with the attached drawings, wherein:

DETAILED DESCRIPTION OF THE INVENTION

Figure 1:
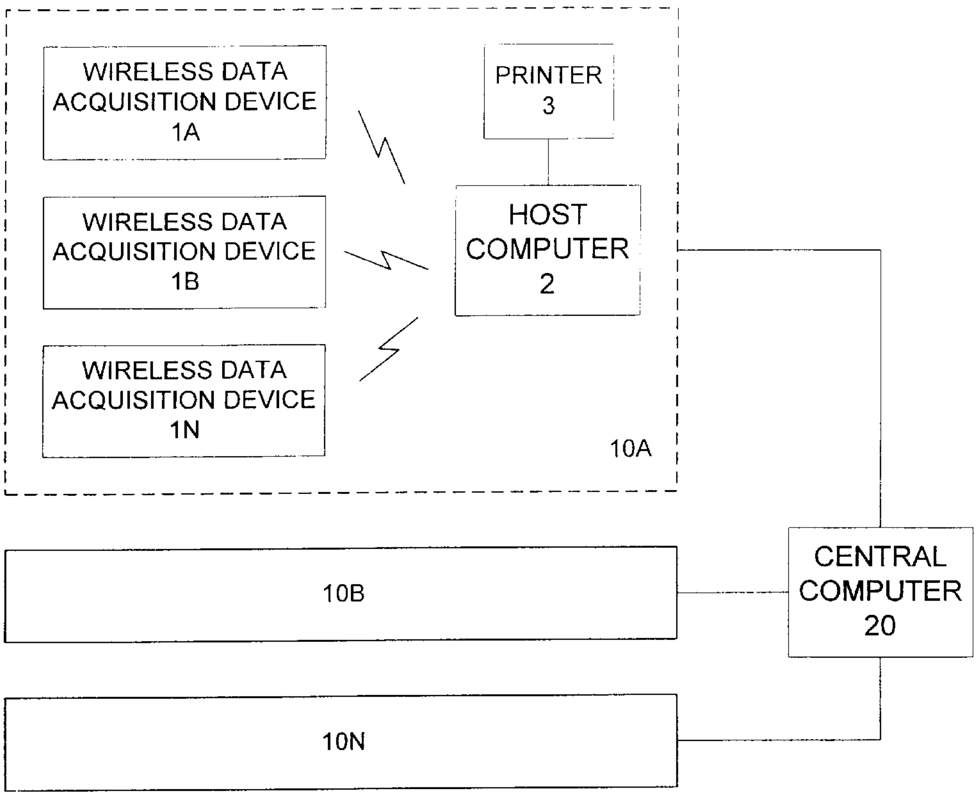
FIG. 1 is a block diagram of the system for carrying out the method according to the present invention.

Referring now to FIG. 1, a voting system in accordance with the present invention comprises plurality of polling stations 10A, 10B . . . 10N, each of which has a host computer 2 which is capable of receiving wireless communications from wireless data acquisition devices 1A–1N. The devices 1A–1N transmit data to the host computer 2 which can then print out the selections made by an individual voter on printer 3. Alternatively, the wireless data acquisition devices 1A–1N can print directly to a printer which is associated with the device or to a printer that is capable of handling multiple devices.

Each of the stations 10A–10N is connected to a central computer 20. While the connections shown therein are wire connections, it is understood that the host computers 2 can communicate via wireless communication protocols with central computer 20.

Moreover, while separate computers 2 for each station are shown connected to a central computer 20, it is understood that the host computer 2 and the central computer 20 can be the same computer and provide computing capability to more than one polling station.

Figure 2:
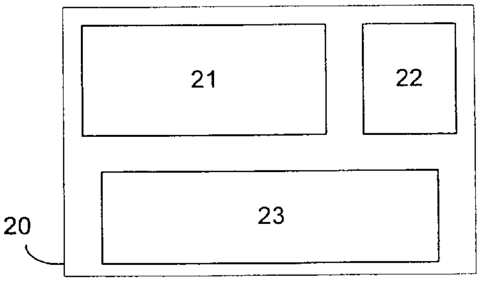
FIG. 2 shows a voter identification card in accordance with the present invention.

FIG. 2 shows one embodiment of a voter registration card in accordance with the present invention. The voter registration card 20 preferably includes area 21 with printed data identifying the voter, area 22 which preferably has a picture of the voter and area 23 which includes a two-dimensional bar code, preferably PDF417, encoding all of the information in area 21 and/or area 22. In one embodiment, the voter identification card 20 can be a motor vehicle license, which in many states in the United States includes the data areas 21–23 as described above.

Figure 3:
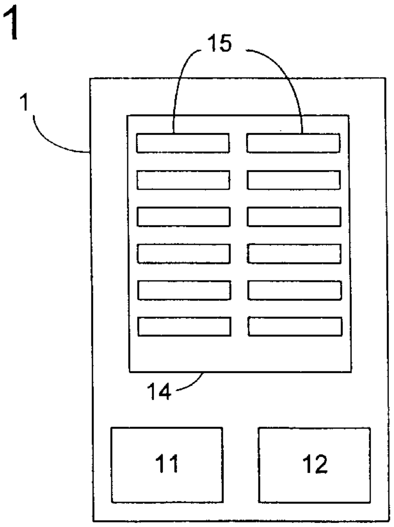
FIG. 3 shows a portable data acquisition device for use with the method and system of the present invention.

FIG. 3 shows a wireless data acquisition device 1 which can be used in accordance with the present invention.

The device 1 includes a display 14 which is preferably a touch screen display and which has ballot entries 15 thereon displayed on the touch screen for selection by a voter. The device also includes a bar code reader 11 for reading the bar code 23 on the voter identification card 20 and a wireless transceiver 12 which is capable of communicating with a host computer 2.

A device of this type is sold, for example, by Symbol Technologies SPT 1500 with a wireless transceiver or other handhelds in that line, PDT or PPT models portable terminals.

Figure 4:
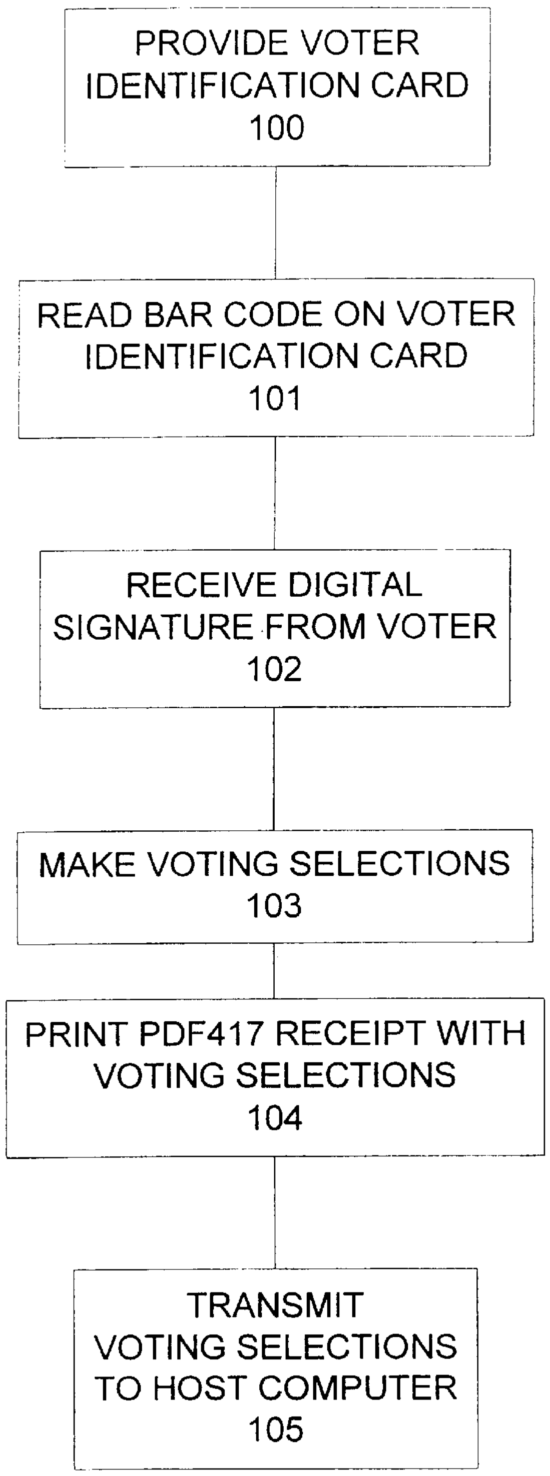
FIG. 4 is a flow chart of the method according to the present invention.

In accordance with the method of the present invention, reference is now made to FIG. 4. In step 100, voters are provided with voter identification cards, such as the one shown in FIG. 2, and preferably, a motor vehicle license, as explained hereinabove.

In order to identify the voter, the bar code on the voter identification card is read in step 101 either by a bar code reader that is connected to the host computer directly or by the wireless data acquisition device which has a built-in bar code reader.

In order to further identify the voter to prevent voter fraud, a digital signature is received from the voter in step 102. The digital signature can be received via the wireless data acquisition device, or it can be entered directly on the host computer 2.

The voter then, in a private place, is given a wireless data acquisition device in step 103 where the voter makes the selections from the slate of candidates. Prior to finalizing the voting selections, a printed PDF417 receipt with the voting selections is printed in step 104. Thereafter, the voter can finalize his or her choices, and the data representing the voter's choices is sent from the wireless data acquisition device to the host computer in step 105 and subsequently to the central computer for tallying along with the votes of other voters.

Figure 5:
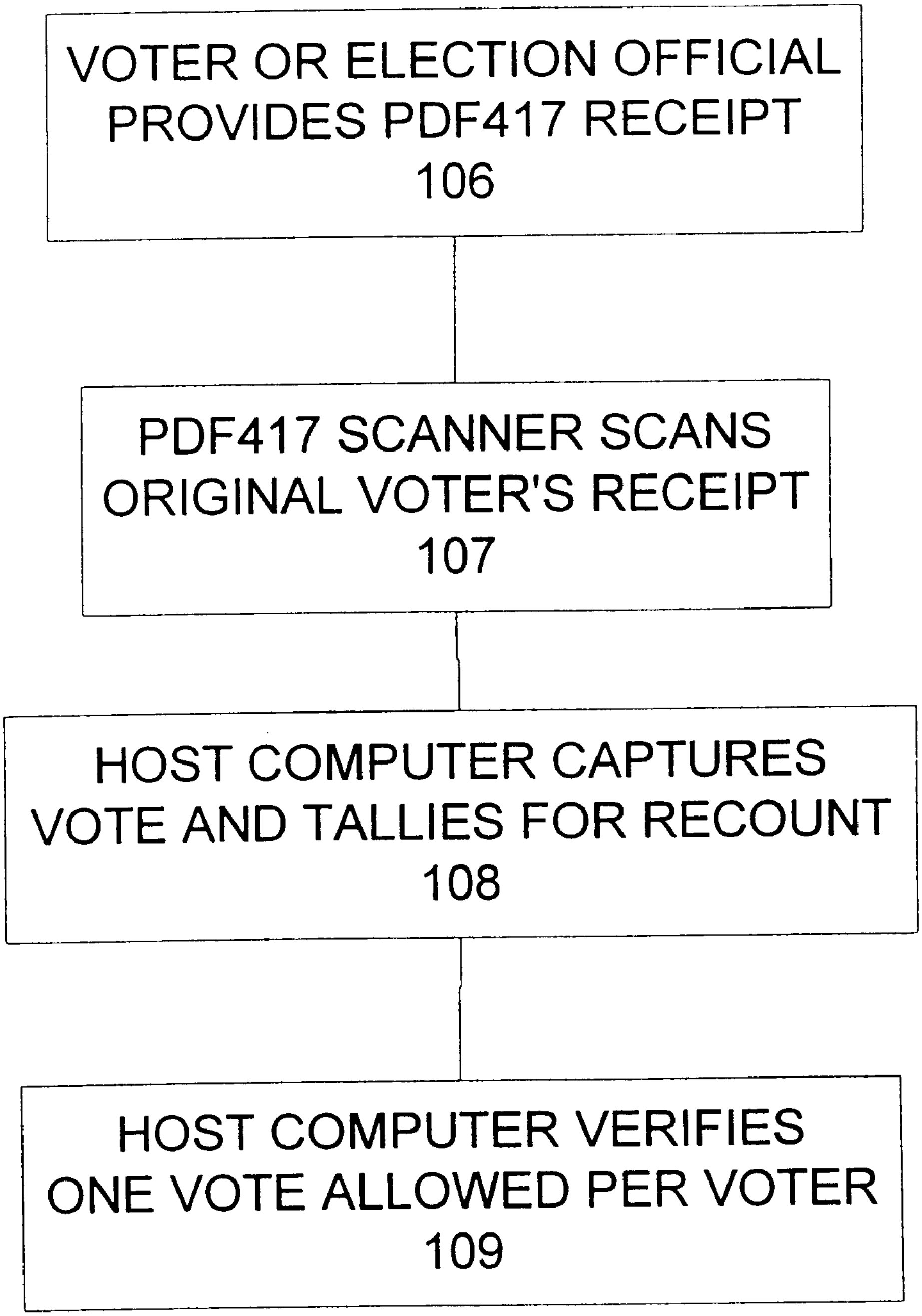
FIG. 5 is a flow chart of the recount method according to the present invention.

FIG. 5 shows the recount method according to the invention. In step 106, the voter or election official provides a PDF417 receipt. The voter's original PDF417 receipt is scanned with a scanner in step 107 and the host computer captures the vote and tallies for a recount in step 108. The host computer verifies that one vote has been allowed for that one voter in step 109.

In an alternative embodiment of the present invention, each electoral district sends out a sample electoral ballot over the Internet as an Acrobat (PDF) file, a Word file or a Mac file. Voters would now have the opportunity to review the ballot on-line.

The voter, after downloading the ballot onto a personal computer, a handheld or other similar device, would point and click on the ballot template to create a pro-forma vote. This vote would not be submitted, it is just a temporary file on a personal computer. Persons who are not registered to vote could also be registered by this method, by visiting a certified registration location. The template would be created to accept only valid choices, and if all required fields are not filled out, the pro-forma vote would not be created, and the voter would be reminded of the fields that are required.

Once the pro-forma vote has been created, the voter prints out a copy of the vote. All choices can be reviewed in detail from the printout. This printout of the voter choices contains a PDF417 bar code. The PDF417 bar code contains the voter identification and all of the choices. Security features built into PDF417 bar codes would only allow the vote to be placed for a particular election. Also, other two-dimensional bar code readers would not be able to decipher the data content on the bar code, since an encryption can be utilized with PDF417.

On election day, the voter takes the PDF417 bar code label to the polling establishment. In private, the voter's PDF417 bar code is scanned, and this scanning can be performed in several ways, that is, by a two-dimensional scanner, a palm device with a two-dimensional scanner or with an imager. The computer at the polling station then displays the election ballot with the voter's choices entered.

The voter then reviews his or her choices in private and modifications can be made, or the voter can simply have the vote entered. Confirmation of the vote is immediate and accurate. The voter then receives a PDF417 bar code receipt containing his or her vote, referenced by a voter number for anonymity. The election official also receives a PDF bar coded vote, which is kept as a voting record.

This process can take place on traditional personal computers, an Internet appliance, a pen tablet, a palm device, a laptop computer or a voting kiosk. Spectrum 24 is a wireless option for this process, but other standard wireless communications protocols can be utilized. Absentee ballots could also be cast by using these methods, these ballots could be created using PDF417 bar codes, encrypted with the date of the vote. Postmarks would no longer be a concern.

For people with no access to create the pro-forma vote, workstations can be set up at the local polling facility to cast the vote as described above. Additional time would be needed to be allotted for these stations. Based upon the proliferation of web technology in the United States, this would be a smaller and smaller group of persons as time went on.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for voting comprising the steps of:

providing a voter identification card to a voter having an optical code including voter identification information;

reading the optical code on the voter identification card of a voter at a polling station prior to permitting said voter to vote;

receiving a digital signature from the voter;

providing a handheld wireless data acquisition device to the voter for making voting selections;

printing a receipt with the voting selections made by said voter; and wirelessly transmitting the voting selections from the handheld wireless data acquisition device to a host computer for tallying the voting selections from a plurality of voters.

2. The method according to claim 1, wherein the optical code is a two-dimensional bar code.

3. The method according to claim 2, wherein the two-dimensional bar code is PDF-417.

4. The method according to claim 1, wherein the voter identification card is a motor vehicle license.

5. The method according to claim 1, wherein the step of wirelessly transmitting comprises transmitting using the IRDA protocol.

6. The method according to claim 1, wherein the step of wirelessly transmitting comprises transmitting using the Blue Tooth protocol.

7. The method according to claim 1, wherein the step of wirelessly transmitting comprises transmitting using an rf protocol.

8. The method according to claim 1, wherein the step of wirelessly transmitting comprises transmitting using the Spectrum 24 protocol.

9. The method according to claim 1, wherein the handheld wireless data acquisition device has a touch screen data input for making voting selections.

10. The method according to claim 1, wherein the handheld wireless data acquisition device has an optical code reader for reading the optical code on the voter identification card and the step of reading comprises using the handheld wireless data acquisition device.

11. The method according to claim 1, wherein the handheld wireless data acquisition device has an input for receiving the electronic signature and the step of receiving comprises using the handheld wireless data acquisition device.

12. The method according to claim 10, wherein the handheld wireless data acquisition device transmits the voter identification information to the host computer to obtain approval of the voter to vote.

13. The method according to claim 11, wherein the handheld wireless data acquisition device transmits the electronic signature to the host computer to obtain approval of the voter to vote.

14. The method according to claim 1, wherein the receipt is printed as a PDF417 symbol.

* * * * *